(12) United States Patent
Lei et al.

(10) Patent No.: US 12,418,939 B2
(45) Date of Patent: Sep. 16, 2025

(54) METHOD AND APPARATUS FOR SIDELINK BURST TRANSMISSION

(71) Applicant: Lenovo (Beijing) Ltd., Beijing (CN)

(72) Inventors: Haipeng Lei, Haidian District (CN); Xiaodong Yu, Haidian District (CN); Zhennian Sun, Chaoyang District (CN); Haiming Wang, Xicheng District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 457 days.

(21) Appl. No.: 18/004,086

(22) PCT Filed: Jul. 3, 2020

(86) PCT No.: PCT/CN2020/100185
§ 371 (c)(1),
(2) Date: Jan. 3, 2023

(87) PCT Pub. No.: WO2022/000479
PCT Pub. Date: Jan. 6, 2022

(65) Prior Publication Data
US 2023/0328784 A1  Oct. 12, 2023

(51) Int. Cl.
*H04W 74/0816* (2024.01)
*H04W 72/25* (2023.01)
*H04W 74/08* (2009.01)

(52) U.S. Cl.
CPC ....... *H04W 74/0816* (2013.01); *H04W 72/25* (2023.01); *H04W 74/0875* (2013.01)

(58) Field of Classification Search
CPC ............. H04W 74/0816; H04W 72/25; H04W 74/0875; H04W 92/18; H04W 72/40; H04W 76/14
See application file for complete search history.

(56) References Cited

U.S. PATENT DOCUMENTS

| 10,492,218 B2 | 11/2019 | Xiao et al. |
| 2021/0092783 A1* | 3/2021 | Sun ................... H04W 74/0875 |

(Continued)

FOREIGN PATENT DOCUMENTS

| CN | 107734560 A | 2/2018 |
| CN | 110149718 A | 8/2019 |
| WO | 2019217852 A1 | 11/2019 |

OTHER PUBLICATIONS

Mediatek Inc., "Physical layer structure for NR sidelink", 3GPP TSG RAN WG1 Meeting #94bis, R1-1810453, Chengdu, China [retrieved Dec. 27, 2022]. Retrieved from the Internet <https://www.3gpp.org/ftp/TSG_RAN/WG1_RL1/TSGR1_94b/Docs/>., Oct. 2018, 9 Pages.

(Continued)

*Primary Examiner* — Ricky Q Ngo
*Assistant Examiner* — Kabir U Jahangir
(74) *Attorney, Agent, or Firm* — FIG. 1 Patents

(57) ABSTRACT

The present application relates to a method and an apparatus for sidelink burst transmission. The method includes: performing a channel access procedure for initiating a channel occupancy for sidelink transmission; transmitting sidelink control information (SCI) to another apparatus within the channel occupancy; wherein the SCI includes an indicator indicating a remaining duration of the channel occupancy; and transmitting sidelink data associated with the SCI to the another apparatus without exceeding the remaining duration of the channel occupancy.

20 Claims, 8 Drawing Sheets

(56) References Cited

U.S. PATENT DOCUMENTS

2021/0136732 A1* 5/2021 Fakoorian ............. H04W 28/26
2023/0232447 A1* 7/2023 Lin ................... H04W 74/0808
370/329

OTHER PUBLICATIONS

PCT/CN2020/100185, "International Preliminary Report on Patentability", PCT Application No. PCT/CN2020/100185, Jan. 12, 2023, 6 pages.

PCT/CN2020/100185, "International Search Report and Written Opinion", PCT Application No. PCT/CN2020/100185, Mar. 30, 2021, 7 pages.

* cited by examiner

METHOD AND APPARATUS FOR SIDELINK BURST TRANSMISSION

TECHNICAL FIELD

Embodiments of the present application generally relate to wireless communication technology, especially to a method and an apparatus for sidelink transmission under 3GPP (3rd Generation Partnership Project) 5G new radio (NR).

BACKGROUND

With network developments of 3rd Generation Partnership Project (3GPP) 5G New Radio (NR), introducing unlicensed spectrum to sidelink transmission is developed. When unlicensed spectrum is used for sidelink transmission, channel access procedure (i.e., Listen-Before-Talk procedure, LBT procedure) different from Sidelink Control Information (SCI) decoding based sensing procedure is required. However, specific details of the channel access procedure of sidelink transmission on unlicensed spectrum have not been discussed in 3GPP 5G NR technology yet.

SUMMARY

Some embodiments of the present application provide a method performed by a first user equipment (UE) for wireless communication. The method includes: performing a channel access procedure for initiating a channel occupancy for sidelink transmission; transmitting sidelink control information (SCI) to a second UE within the channel occupancy, wherein the SCI includes an indicator indicating a remaining duration of the channel occupancy; and transmitting sidelink data associated with the SCI to the second UE without exceeding the remaining duration of the channel occupancy.

Some embodiments of the present application provide a method for wireless communications performed by a first UE. The method includes: receiving SCI from a second UE within a channel occupancy initiated by the second UE, wherein the SCI includes an indicator indicating a remaining duration of the channel occupancy; receiving sidelink data associated with the SCI from the second UE without exceeding the remaining duration of the channel occupancy; performing a channel access procedure; and transmitting sidelink feedback to the second UE in response to the channel access procedure being successful.

Some embodiments of the present application provide a method for wireless communications performed by a first UE. The method includes: detecting SCI transmitted from a second UE within a channel occupancy initiated by the second UE, wherein the SCI includes an indicator indicating a remaining duration of the channel occupancy; and performing a channel access procedure after the remaining duration of the channel occupancy.

Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
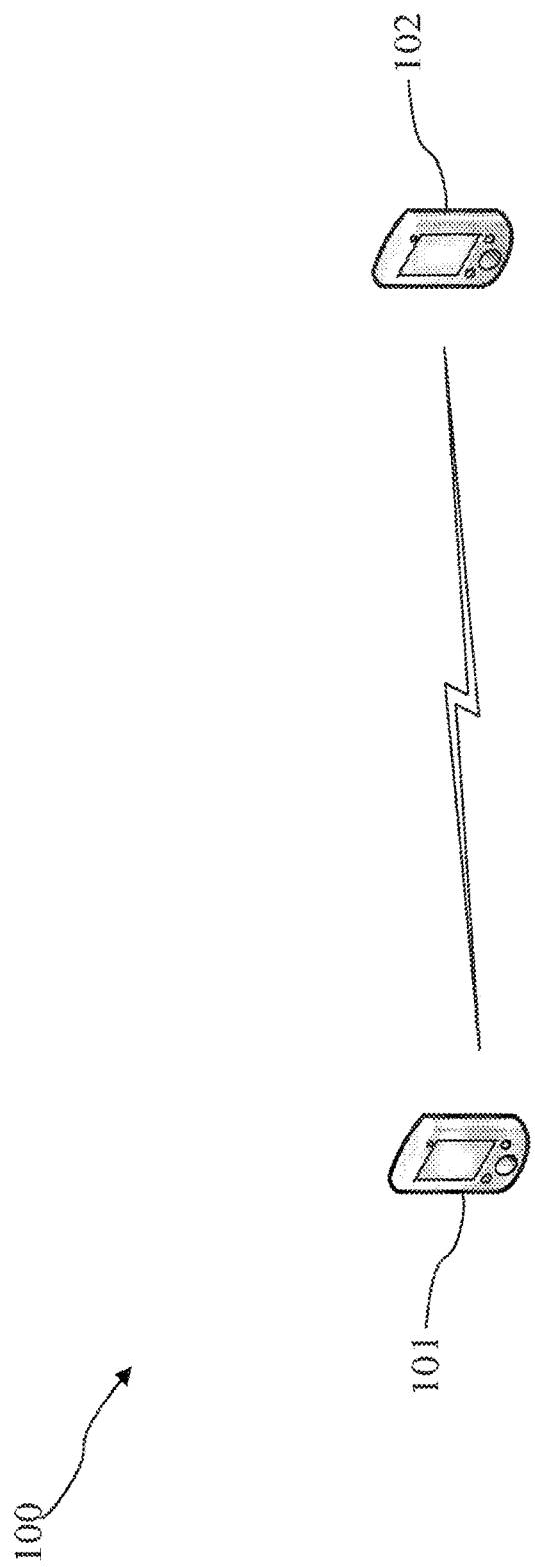
FIG. 1 illustrates a schematic diagram of a wireless communication system in accordance with some embodiments of the present application.

FIG. 1 illustrates a schematic diagram of a wireless communication system 100 in accordance with some embodiments of the present application. The wireless communication system 100 includes a user equipment (UE) 101 and a UE 102. Although a specific number of UEs 101 and 102 are depicted in FIG. 1, it is contemplated that any number of UE, base station (BS) and core network (CN) may be included in the wireless communication system 100.

UEs 101 and 102 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, UEs 101 and 102 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, UEs 101 and 102 may include, for example, but is not limited to, wearable devices, such as smart watches, fitness bands, optical head-mounted displays, or the like. Moreover, UEs 101 and 102 may be referred to as a subscriber unit, a mobile, a mobile station, a user, a terminal, a mobile terminal, a wireless terminal, a fixed terminal, a subscriber station, a user terminal, or a device, or described using other terminology used in the art. UEs 101 and 102 may communicate with each other via sidelink transmission.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

According to existing agreements (i.e., 3GPP TS 37.213), a channel access procedure (i.e., Listen-Before-Talk procedure, LBT procedure) for unlicensed spectrum may include channel access Type 1 (i.e., LBT Cat. 4). When UE 101 successfully performs channel access Type 1 for unicast communication with UE 102, UE 101 may occupy the channel with a duration (e.g., maximum to 2 ms, 4 ms, 6 ms or 10 ms). Then, UE 101 may start sidelink transmission to UE 102 and transmit Physical Sidelink Control Channel (PSCCH) and/or Physical Sidelink Shared Channel (PSSCH) in multiple consecutive slots without any transmission gap so as to avoid the risk of losing occupancy of the channel.

However, UE 102 may not have any information of how many remaining consecutive slot(s) UE 101 may use to transmit sidelink data. Therefore, if UE 102 switches operating mode from receiving mode (e.g., Rx mode) to transmitting mode (e.g., Tx mode) for transmitting sidelink data/control signal to other UE(s) before UE 101 stops the sidelink data transmission, UE 102 may miss rest part of the sidelink data from UE 101. In addition, if UE 102 is requested to send Physical Sidelink Feedback Channel (PSFCH) corresponding to received sidelink data from UE 101, since UE 101 may not receive PSFCH corresponding to missed sidelink data from UE 102, UE 101 may need to perform another channel access Type 1 for retransmitting the missed sidelink data. If UE 102 is not requested to send PSFCH corresponding to received sidelink data from UE 101, UE 101 may not determine whether transmitted sidelink data is missed by UE 102 or not so that UE 101 may not retransmit the missed sidelink data. In this way, some sidelink data loses the opportunity to be retransmitted.

Accordingly, in the present disclosure, to avoid missing any transmission of sidelink data, a sidelink burst transmission using an indicator indicating a remaining duration of channel occupancy for a channel access procedure may be introduced. More details on embodiments of the present disclosure will be further described hereinafter.

Figure 2:
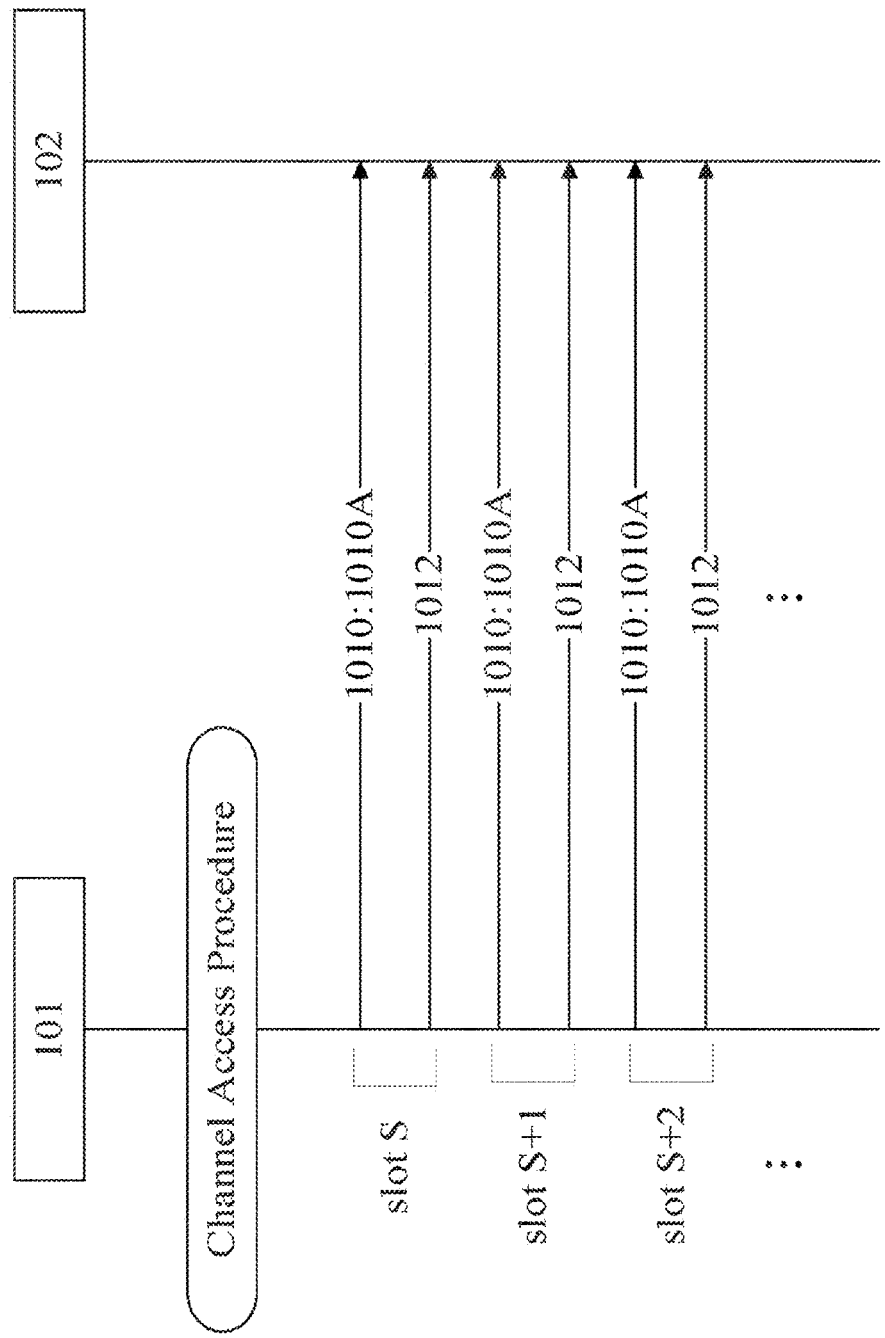
FIG. 2 illustrates a schematic diagram of message transmission in accordance with some embodiments of the present application.

FIG. 2 is a schematic diagram of message transmission in accordance with some embodiments of the present application. In particular, UE 101 may perform a channel access procedure (i.e., LBT Cat. 4) for initiating a channel occupancy for sidelink transmission. After successfully performing the channel access procedure, UE 101 may transmit sidelink control information (SCI) 1010 to UE 102 in each slot (e.g., slot S, slot S+1, slot S+2 . . . ) within the channel occupancy.

In some embodiments, SCI 1010 may include an indicator 1010A indicating a remaining duration of the channel occupancy. After receiving SCI 1010, UE 102 may be informed of the remaining duration of the channel occupancy according to the indicator 1010A. Accordingly, based on SCI 1010 and indicator 1010A included in SCI 1010, UE 101 may transmit sidelink data 1012 to UE 102 without exceeding the remaining duration of the channel occupancy. In other words, UE 101 may transmit sidelink data 1012 to UE 102 within the remaining duration of the channel occupancy.

On the other hand, based on SCI 1010 and indicator 1010A included in SCI 1010, UE 102 may receive sidelink data 1012 from UE 101 without exceeding the remaining duration of the channel occupancy. In other words, UE 102 may receive sidelink data 1012 from UE 101 within the remaining duration of the channel occupancy. In addition, UE 102 may not perform any channel access procedure until the remaining duration of the channel occupancy expires. Accordingly, UE 102 may not miss any sidelink data transmitted from UE 101 within the remaining duration of the channel occupancy.

In some embodiments, UE 101 may reserve resource of PSFCH transmission for UE 102 to transmit sidelink Hybrid Automatic Repeat Request Acknowledgement (HARQ-ACK) feedback to UE 101 during the channel occupancy. Therefore, the remaining duration of the channel occupancy may include: (1) duration of PSCCH transmission(s); (2) duration PSSCH transmission(s); (3) duration of PSFCH transmission(s); and (4) gap duration between the last PSSCH transmission and the first PSFCH transmission. In these embodiments, UE 102 may perform channel access Type 2 (i.e., LBT Cat. 2) and transmit PSFCH(s) to UE 101 within the remaining duration of the channel occupancy.

In some embodiments, UE 101 may not reserve resource of PSFCH transmission for UE 102 to transmit sidelink HARQ-ACK feedback to UE 101 during the channel occupancy. Therefore, the remaining duration of the channel occupancy may only include: (1) duration of PSCCH transmission(s); and (2) duration PSSCH transmission(s). In these embodiments, UE 102 may perform channel access Type 1 (i.e., LBT Cat. 4) and transmit PSFCH(s) to UE 101.

Accordingly, indicator 1010A may be further used by UE 102 to determine which type of channel access (i.e., channel access Type 1 or channel access Type 2) is to be used for transmitting PSFCH(s). Particularly, when the remaining duration of the channel occupancy indicated by indicator 1010A includes duration of PSFCH transmission, UE 102 may perform channel access Type 2 (i.e., LBT Cat. 2) and transmit PSFCH(s) to UE 101 within the remaining duration of the channel occupancy. When the remaining duration of the channel occupancy indicated by indicator 1010A does not include duration of PSFCH transmission, UE 102 may perform channel access Type 1 (i.e., LBT Cat. 4) and transmit PSFCH(s) to UE 101 outside the remaining duration of the channel occupancy.

In some embodiments, a maximum value of the remaining duration of the channel occupancy may be equal to a maximum duration of the channel occupancy minus a duration of one slot. For example, when the maximum duration of the channel occupancy is 10 slots, the maximum value of the remaining duration of the channel occupancy is 10−1=9 (slots). For another example, when the maximum duration of the channel occupancy is 10 ms and subcarrier spacing is 30 kHz, there are 20 slots. Therefore, the duration of one slot is 0.5 ms, and the maximum value of the remaining duration of the channel occupancy is 20−1=19 slots, i.e., 10−0.5=9.5 (ms).

In some embodiments, the maximum duration of the channel occupancy may be determined based on a channel access priority class (CAPC) and a subcarrier spacing. More specifically, a table of CAPC of the present disclosure below may refer to CAPC of 3GPP TS 37.213.

| Channel Access Priority Class | maximum duration of the channel occupancy |
|---|---|
| 1 | 2 ms |
| 2 | 4 ms |
| 3 | 6 ms or 10 ms |
| 4 | 6 ms or 10 ms |

Accordingly, for example, when CAPC of the channel access between UE 101 and UE 102 is determined as 1, the maximum duration of the channel occupancy is 2 ms, which is equivalent to 2 slots in case of 15 kHz subcarrier spacing, 4 slots in case of 30 kHz subcarrier spacing, 8 slots in case of 60 kHz subcarrier spacing or 16 slots in case of 120 kHz subcarrier spacing. For another example, when CAPC of the channel access between UE 101 and UE 102 is determined as 4, the maximum duration of the channel occupancy is 10 ms, which is equivalent to 10 slots in case of 15 kHz subcarrier spacing, 20 slots in case of 30 kHz subcarrier spacing, 40 slots in case of 60 kHz subcarrier spacing or 80 slots in case of 120 kHz subcarrier spacing.

In some embodiments, because the remaining duration of the channel occupancy may be dynamic within the channel occupancy, the remaining duration of the channel occupancy may be updated from slot to slot within the channel occupancy. In detail, there may be slots 1 to N within the channel occupancy. Because the remaining duration of the channel occupancy may decrease within the channel occupancy, UE 101 may update the remaining duration of the channel occupancy in every slot. More specifically, as for slot 1, UE 101 may determine the remaining duration of the channel occupancy for the rest slots (e.g., slot 2 to slot N) and indicate the remaining duration of the channel occupancy in SCI of slot 1. Next, as for slot n, UE 101 may update the remaining duration of the channel occupancy for the rest slots (e.g., slot n+1 to slot N) and indicate the remaining duration of the channel occupancy in SCI of slot n.

In some embodiments, the indicator of the remaining duration of the channel occupancy may indicate consistent information on the remaining duration of the channel occupancy. Further, in some implementations, consistent information may be indicated in unit of slot. In detail, when UE 101 transmits SCI in slot X and the indicator of the corresponding SCI indicates the remaining duration of the channel occupancy as Y slots, it may represent that UE 101 occupies Y slots from slot X+1 to slot X+Y. When UE 101 transmits SCI in slot X+1 and the indicator of the corresponding SCI indicates the remaining duration of the channel occupancy as Y−1 slots, it may represent that UE 101 occupies Y−1 slots from slot X+2 to slot X+Y.

In other words, in these embodiments, the remaining duration of the channel occupancy (e.g., Y slots) indicated in slot X may be equal to another remaining duration of the channel occupancy (e.g., Y−1 slots) indicated in slot X+1 plus duration of one slot, the remaining duration of the channel occupancy indicated in slot X+1 (e.g., Y−2 slots) may be equal to another remaining duration of the channel occupancy (e.g., Y−3 slots) indicated in slot X+2 plus duration of one slot, and so on.

In some embodiments, the remaining duration of the channel occupancy may be indicated in unit of millisecond (e.g., 9.75 ms, 9.5 ms, 9.25 ms, 9 ms, . . . , 1 ms, 0.75 ms, 0.5 ms, 0.25 ms, 0 ms), and the remaining duration of the channel occupancy may be determined based on the maximum duration of the channel occupancy of CACP and subcarrier spacing.

For example, when the maximum duration of the channel occupancy is equal to 10 ms and subcarrier spacing value is 15 kHz, the maximum duration of the channel occupancy contains 10 slots so that every millisecond contains one slot. When a SCI is transmitted in first slot of the maximum duration of channel occupancy, there are maximum 9 ms remained in the maximum duration of channel occupancy. Therefore, a maximum value of the remaining duration of the channel occupancy may be indicated in the SCI in the first slot as 9 ms. When a SCI is transmitted in the second slot of the maximum duration of channel occupancy, there are maximum 8 ms remained in the maximum duration of channel occupancy. Therefore, a maximum value of the remaining duration of the channel occupancy may be indicated in the SCI in the second slot as 8 ms.

In addition, when a SCI is transmitted in last slot of the maximum duration of channel occupancy, there is no duration remained in the channel occupancy. Therefore, the remaining duration of the channel occupancy may be indicated in the SCI in the last slot as zero.

In some implementations, depending on scheduling policy of UE 101, indicator included in SCI may indicate the remaining duration of the channel occupancy smaller than the maximum value of the remaining duration of the channel occupancy if UE 101 determines there are less under-transmitted data in buffer and no need to occupy the maximum duration of the remaining channel occupancy.

In some embodiments, to reduce signalling overhead for indicating the remaining duration of the channel occupancy in SCI, a set of possible values, in unit of millisecond, of the remaining duration of the channel occupancy may be introduced. For example, as for 15 kHz subcarrier spacing, the granularity of the possible values in the set may be 1 ms, e.g., set {1 ms, 2 ms, 3 ms, 4 ms, . . . , 10 ms}. For another example, as for 30 kHz subcarrier spacing, the granularity of the possible values in the set may be 0.5 ms, e.g., set {0.5 ms, 1 ms, 1.5 ms, 2 ms, . . . , 9.5 ms, 10 ms}.

In some implementations, the set of possible values of the remaining duration of the channel occupancy used by UE 101 and 102 may be configured by Radio Resource Control (RRC) signalling. In some implementations, the set of possible values of the remaining duration of the channel occupancy used by UE 101 and 102 may be predefined in default.

In some embodiments, when UE 101 has not decided the remaining duration of the channel occupancy or there is no suitable value in the set to exactly indicate the remaining duration of the channel occupancy, the set of possible values of the remaining duration of the channel occupancy may introduce a specific element for indicating that the remaining duration of the channel occupancy is non-available. For example, the set is {−1, 1 ms, 2 ms, 3 ms, 4 ms, . . . , 10 ms}, and "−1" is the specific element for indicating that the remaining duration of the channel occupancy is non-available. Upon reception of the specific element in a SCI, UE 102 may continue to detect following SCI to get information of the remaining duration of the channel occupancy.

In some embodiments, when the set of possible values of the remaining duration of the channel occupancy is introduced, indicator may use X1 bits in SCI. Value of X1 is determined as:

$$X1 = \lceil \log_2 N \rceil$$

where N is a number of elements in the set of possible values of the remaining durations of the channel occupancy. For example, when the set of possible values of the remaining duration of the channel occupancy is {1 ms, 2 ms, 3 ms, 4 ms, 5 ms} which includes 5 elements, indictor uses "3" bits in SCI (e.g., "000" for 1 ms, "001" for 2 ms, "010" for 3 ms, "011" for 4 ms, "100" for 5 ms).

In some embodiments, the remaining duration of the channel occupancy may be indicated in unit of slot, e.g., M−1 slots, M−2 slot, . . . , 2 slots, 1 slot, 0, where M is a maximum number of slots in the maximum duration of the channel occupancy. In detail, the remaining duration of the channel occupancy may be determined based on the maximum duration of the channel occupancy of CACP and subcarrier spacing. In some implementations, M may be listed in the table below:

| maximum duration of the channel occupancy | M based on 15 kHz subcarrier spacing | M based on 30 KHz subcarrier spacing | M based on 60 KHz subcarrier spacing | M based on 120 kHz subcarrier spacing |
|---|---|---|---|---|
| 2 ms | 2 | 4 | 8 | 16 |
| 3 ms | 3 | 6 | 12 | 24 |
| 4 ms | 4 | 8 | 16 | 32 |
| 6 ms | 6 | 12 | 24 | 48 |
| 8 ms | 8 | 16 | 32 | 64 |
| 10 ms | 10 | 20 | 40 | 80 |

For example, when a SCI is transmitted in first slot of the maximum duration of channel occupancy, the remaining duration of the channel occupancy is M−1 slots. Therefore, a maximum value of the remaining duration of the channel occupancy may be indicated in the SCI in the first slot as M−1 slots. When a SCI is transmitted in second slot of the maximum duration of channel occupancy, the remaining duration of the channel occupancy is M−2 slots. Therefore, a maximum value of the remaining duration of the channel occupancy may be indicated in the SCI in the first slot as M−2 slots.

In some implementations, depending on scheduling policy of UE 101, indicator included in SCI may indicate the remaining duration of the channel occupancy smaller than the maximum value of the remaining duration of the channel occupancy if UE 101 determines there are less data in the buffer and no need to occupy the maximum duration of the remaining channel occupancy.

In some embodiments, when the remaining duration of the channel occupancy is indicated in unit of slot, indicator may use X2 bits in SCI. Value of X2 is determined as:

$$X2 = \lceil \log_2(M-1) \rceil$$

where M is a maximum number of slots of the channel occupancy. For example, when M is 5, the maximum value of the remaining duration of the channel occupancy is 5−1=4 so that indictor needs "2" bits in SCI (e.g., "00" for 1 slot, "01" for 2 slots, "10" for 3 slots, "11" for 4 slots). For another example, when M is 10, the maximum value of the remaining duration of the channel occupancy is 10−1=9 so that indictor needs "4" bits in SCI (e.g., "0000" for 1 slot, "0001" for 2 slots, "0010" for 3 slots, . . . , "1000" for 9 slots).

In some embodiments, when the value M−1 is too high (i.e., needs too many bits in SCI), a set of possible values, in unit of slot, of the remaining duration of the channel occupancy may be introduced. In some implementations, the set of possible values of the remaining duration of the channel occupancy used by UE 101 and UE 102 may be configured by RRC signalling. In some implementations, the set of possible values of the remaining duration of the channel occupancy used by UE 101 and UE 102 may be predefined in default.

In some embodiments, when UE 101 has not decided the remaining duration of the channel occupancy or there is no suitable value in the set to exactly indicate the remaining duration of the channel occupancy, the set of possible values of the remaining duration of the channel occupancy may introduce a specific element for indicating that the remaining duration of the channel occupancy is non-available. For example, the set is {−1, 1 slot, 2 slots, 3 slots, 4 slots, . . . , 10 slots}, and "−1" is the specific element for indicating that the remaining duration of the channel occupancy is non-available. Upon reception of the specific element in a SCI, UE 102 may continue to detect following SCI to get information of the remaining duration of the channel occupancy.

In some embodiments, when the set of possible values of the remaining duration of the channel occupancy is introduced, indicator may use X3 bits in SCI. Value of X3 is determined as:

$$X3 = \lceil \log_2 N \rceil$$

where N is a number of elements in the set of possible values of the remaining durations of the channel occupancy. For example, when the set of possible values of the remaining duration of the channel occupancy is {1 slot, 2 slots, 3 slots, 4 slots}, which includes 4 elements, indictor uses "2" bits in SCI (e.g., "00" for 1 slot, "01" for 2 slots, "10" for 3 slots, "11" for 4 slots).

In some embodiments, the remaining duration of the channel occupancy may be indicated in unit of symbol, e.g., a*(M−1) symbol, a*(M−2) symbols, . . . , a*2 symbols, a*1 symbols, 0, where M is a maximum number of slots in the maximum duration of the channel occupancy and a is a number of symbol in one slot, e.g., a=14.

In some embodiments, when the remaining duration of the channel occupancy is indicated in unit of symbol, indicator may use X4 bits in SCI. Value of X4 is determined as:

$$X4 = \lceil \log_2 a \times (M-1) \rceil$$

where a is a number of symbols of one slot and M is a maximum number of slots of the channel occupancy. For example, when a is 14 and M is 5, the maximum value of the remaining duration of the channel occupancy is 14*(5−1)= 56 so that indictor needs "6" bits in SCI (e.g., "000000" for 1 symbol, "000001" for 2 symbols, "000010" for 3 symbols, . . . , "110111" for 56 symbols). For another example, when a is 14 and M is 2, the maximum value of the remaining duration of the channel occupancy is 14*(2−1)= 14 so that indictor needs "4" bits in SCI (e.g., "0000" for 1 symbol, "0001" for 2 symbols, . . . , "1101" for 14 symbols).

In some embodiments, when the value a*(M−1) is too high (i.e., needs too many bits in SCI), a set of possible values, in unit of symbol, of the remaining duration of the channel occupancy may be introduced. In some implementations, the set of possible values of the remaining duration of the channel occupancy used by UE 101 and UE 102 may be configured by RRC signalling. In some implementations, the set of possible values of the remaining duration of the channel occupancy used by UE 101 and UE 102 may be predefined in default.

Figure 3:
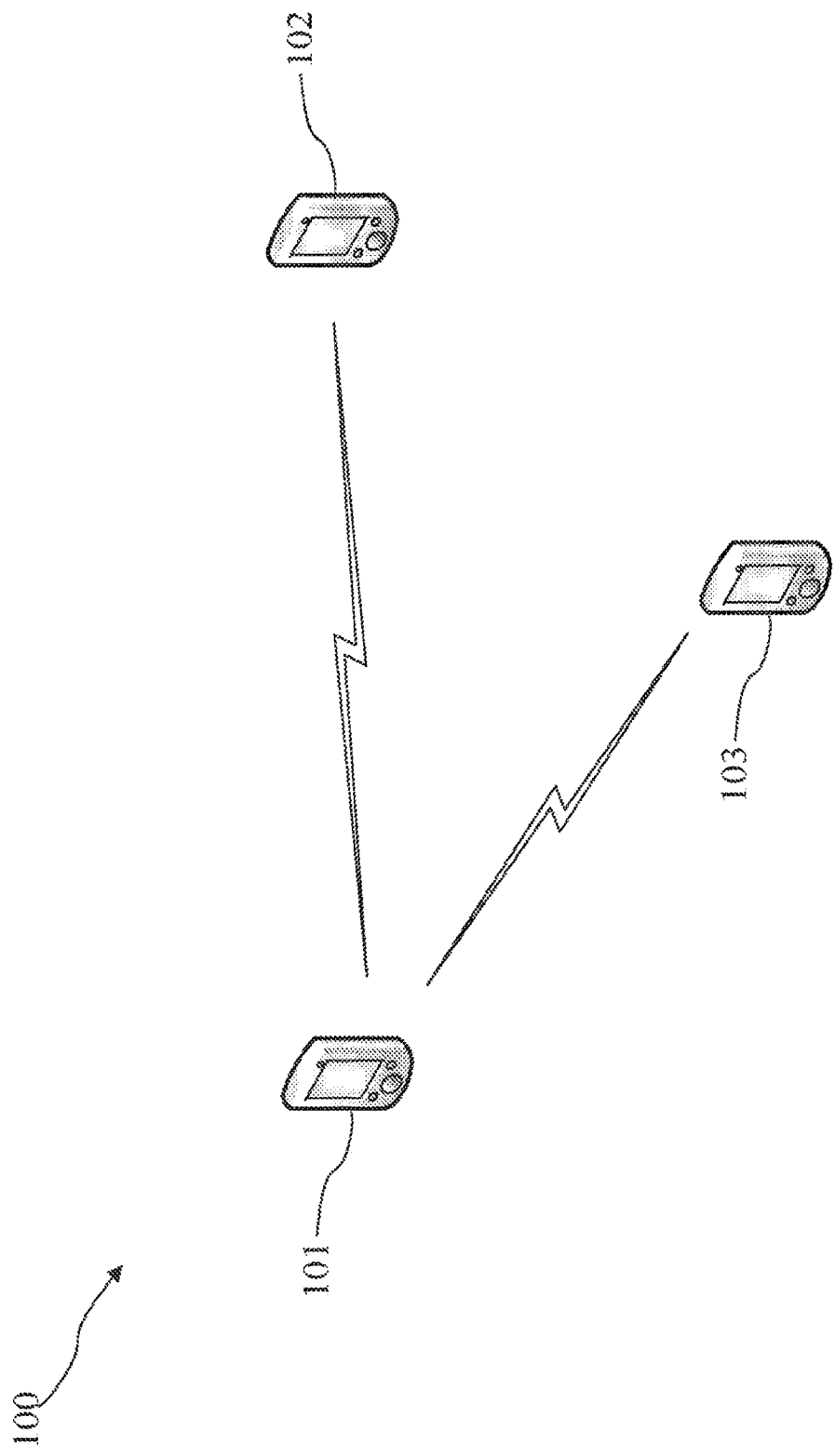
FIG. 3 illustrates a schematic diagram of a wireless communication system in accordance with some embodiments of the present application.

FIG. 3 illustrates a schematic diagram of the wireless communication system 100 in accordance with some embodiments of the present application. The wireless communication system 100 includes UE 101, UE 102 and a UE 103. In detail, when UE 101 performs the channel access procedure for initiating the channel occupancy for the sidelink transmission with UE 102, a channel is occupied during PSCCH/PSSCH transmissions of UE 101 and PSFCH transmission of UE 102 except for gap between end of last PSCCH/PSSCH transmissions of UE 101 and beginning of PSFCH transmission of UE 102.

Figure 4:
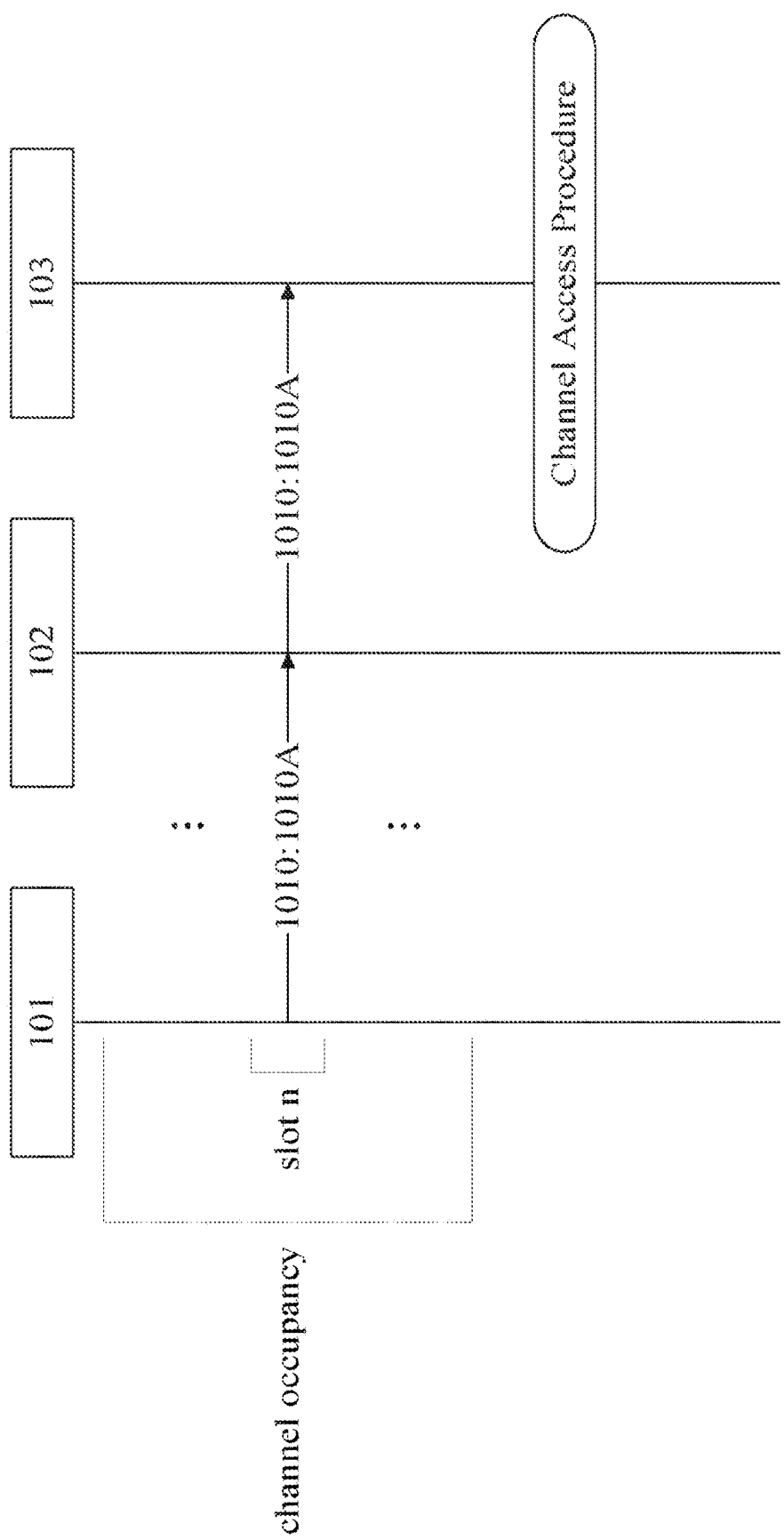
FIG. 4 illustrates a schematic diagram of message transmission in accordance with some embodiments of the present application.

FIG. 4 is a schematic diagram of message transmission in accordance with some embodiments of the present application. UE 103 may detect SCI 1010 (e.g., SCI 1010 in slot n) transmitted from UE 101 for scheduling data transmission from UE 101 to UE 102, and determine the remaining duration of channel occupancy according to indicator 1010A of SCI 1010. Therefore, UE 103 may be aware that the occupancy of the channel will not be released until the remaining duration of channel occupancy. Accordingly, UE 103 may perform a channel access procedure after the remaining duration of channel occupancy. In other words, it is not necessary for UE 103 to perform any useless channel access during the remaining duration of channel occupancy.

In some implementations, UE 103 may enter a sleep mode after determining the remaining duration of channel occupancy, and wake up after the remaining duration of channel occupancy. After wake up, UE 103 may perform the channel access procedure. In some implementations, UE 103 may determine whether the remaining duration of channel occupancy is equal to zero for each SCI 1010 transmitted from UE 101 to UE 102. When UE 103 determines that the remaining duration of channel occupancy is equal to zero, UE 103 may start to perform the channel access procedure.

In some embodiments, when indicator 1010A indicates the consistent information on the remaining duration of the channel occupancy, UE 103 may not need to detect SCI 1010 from UE 101 in every slot. With the consistent information on the remaining duration of the channel occupancy, UE 103 may skip subsequent SCI detection once UE 103 detects one SCI and be aware of the remaining duration of the channel occupancy.

For example, when UE 101 transmits SCI in slot X and the indicator of the corresponding SCI indicates the remaining duration of the channel occupancy as Y slots, UE 103 may be aware that UE 101 occupies the channel from slot X+1 to slot X+Y after detecting SCI in slot X. In another example, when UE 101 transmits SCI in slot X+1 and the indicator of the corresponding SCI indicates the remaining duration of the channel occupancy as Y−1 slots, UE 103 may be aware that UE 101 occupies the channel from slot X+2 to slot X+Y after detecting SCI in slot X+1. In other words, whether UE 103 detects SCI in slot X or slot X+1, UE 103 is aware that the channel is occupied to slot X+Y.

Figure 5A:
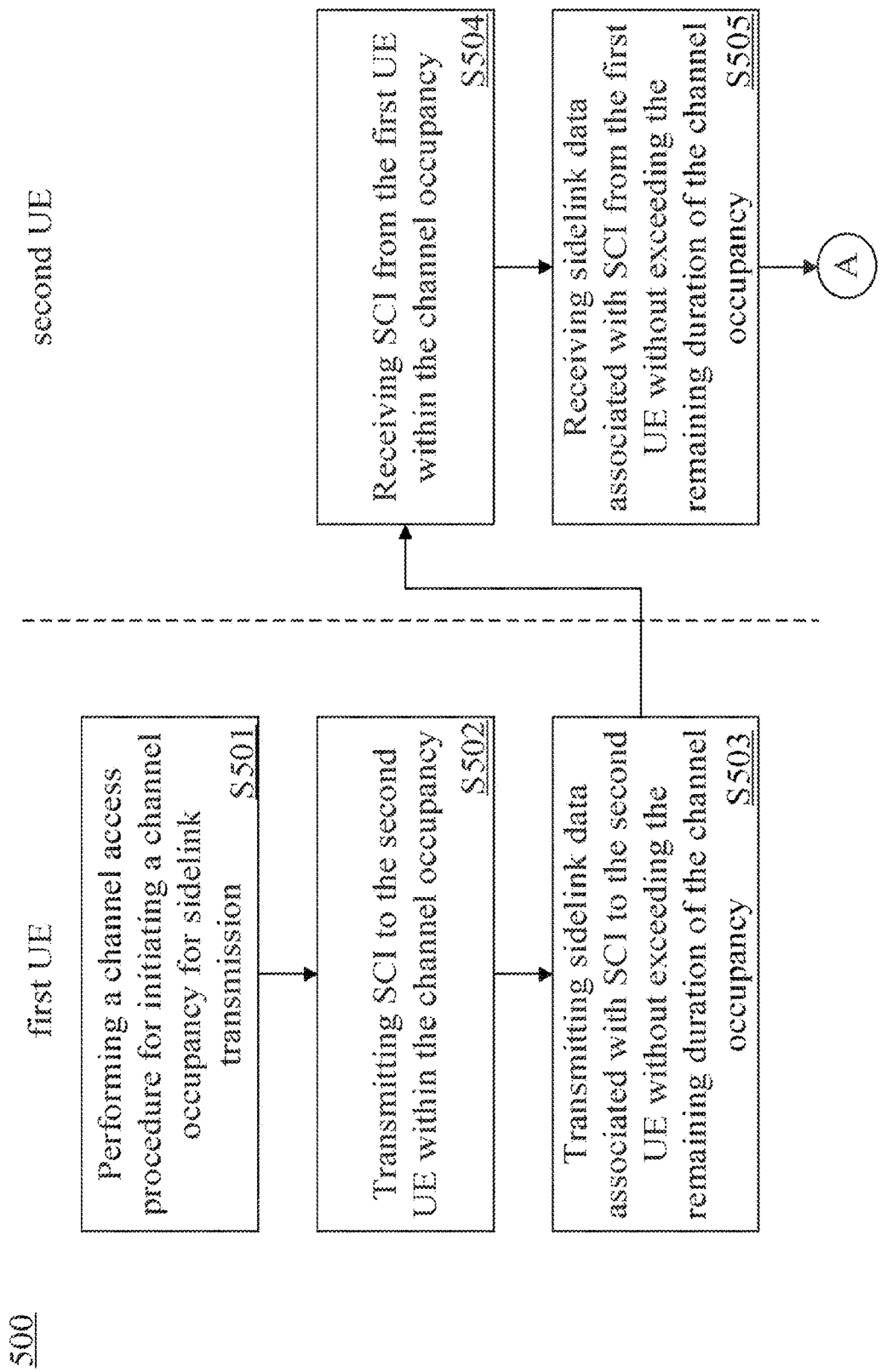
FIGS. 5A and 5B illustrate flow charts of a method for wireless communications according to an embodiment of the present disclosure.
Figure 5B:
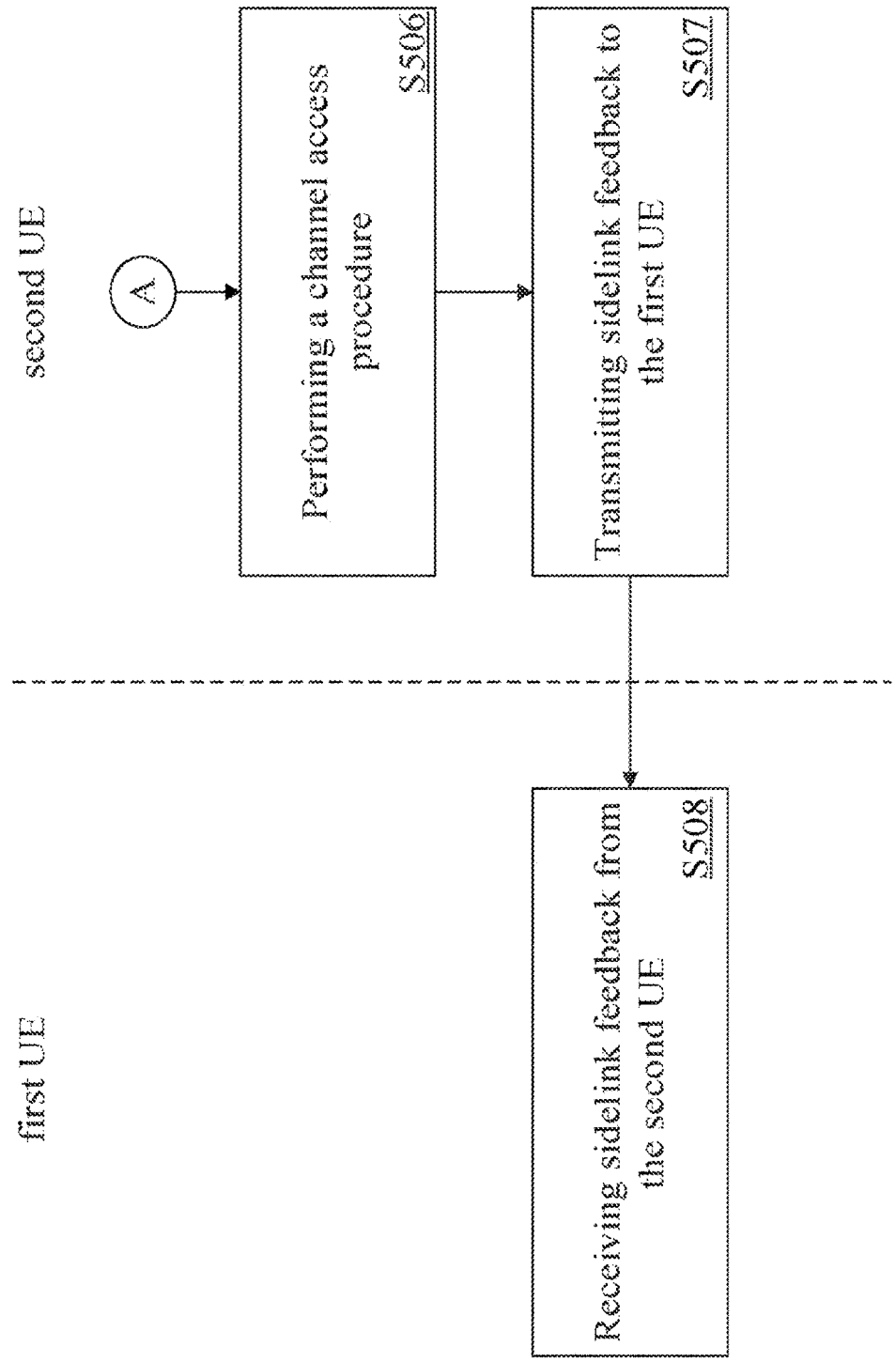

FIGS. 5A and 5B illustrate flow charts of a method for wireless communications in accordance with some embodiments of the present application. Referring to FIGS. 5A and 5B, method 500 is performed by first UE (e.g., UE 101) and second UE (e.g., UE 102) in some embodiments of the present application.

In some embodiments, operation S501 is executed to perform, by the first UE, a channel access procedure for initiating a channel occupancy for sidelink transmission. Operation S502 is executed to transmitting, by the first UE, SCI to the second UE within the channel occupancy. The SCI may include an indicator indicating a remaining duration of the channel occupancy. Operation S503 is executed to transmit, by the first UE, sidelink data associated with the SCI to the second UE without exceeding the remaining duration of the channel occupancy.

Then, operation S504 is executed to receive, by the second UE, the SCI from the first UE within the channel occupancy initiated by the first UE. Operation S505 is executed to receive, by the second UE, the sidelink data associated with the SCI from the first UE without exceeding the remaining duration of the channel occupancy.

In some embodiments, operation S506 is further executed to perform, by the second UE, a channel access procedure. Operation S507 is executed to transmit, by the second UE, sidelink feedback to the first UE in response to the channel access procedure in operation S506 being successful. Operation S508 is executed to receive, by the first UE, the sidelink feedback from the second UE.

In some implementations, the channel access procedure performed by the second UE may be the channel access procedure Type 2 (i.e., LBT Cat. 2) in response to the sidelink feedback being transmitted inside of the remaining duration of the channel occupancy. In some implementations, the channel access procedure performed by the second UE may be the channel access procedure Type 1 (i.e., LBT Cat. 4) in response to the sidelink feedback being transmitted outside of the remaining duration of the channel occupancy.

Figure 6:
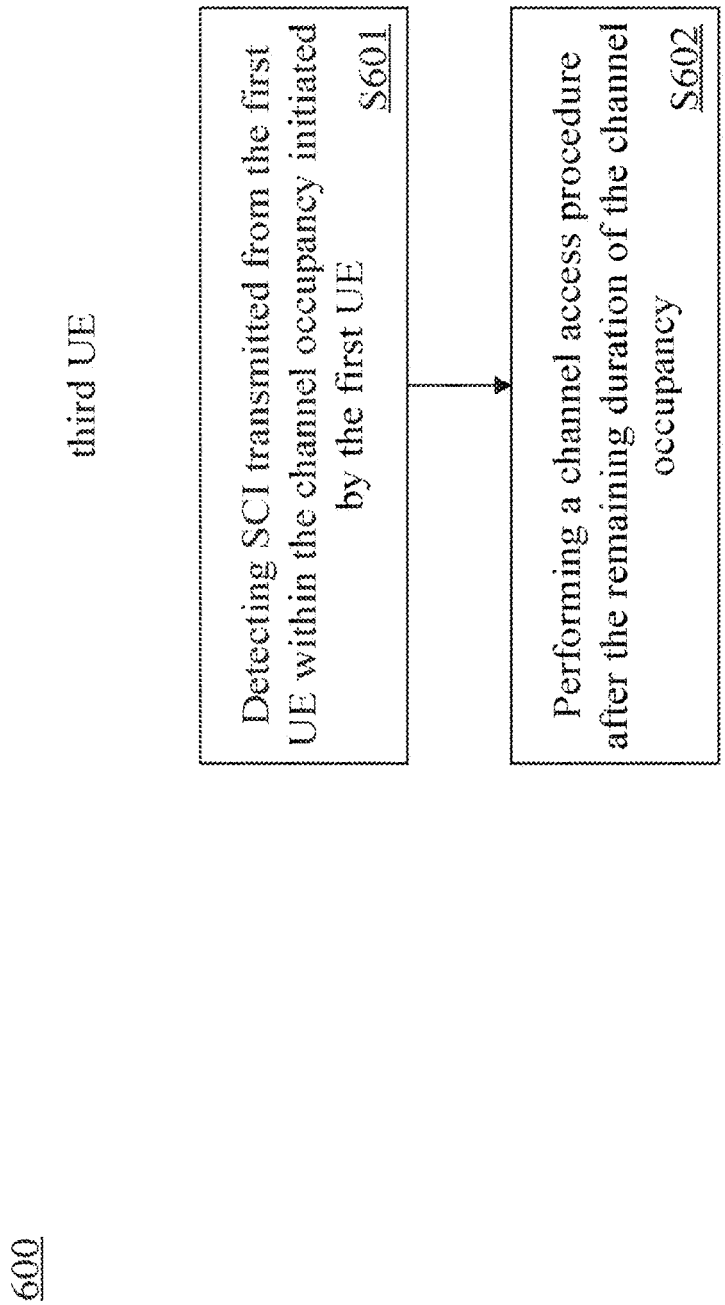
FIG. 6 illustrates a flow chart of a method for wireless communications according to an embodiment of the present disclosure.

FIG. 6 illustrates a flow chart of a method for wireless communications in accordance with some embodiments of the present application. Referring to FIG. 6, method 600 is performed by third UE (e.g., UE 103) in some embodiments of the present application.

Operation S601 is executed to detect, by the third UE, SCI transmitted from the first UE within the channel occupancy initiated by the first UE. The SCI may include the indicator indicating the remaining duration of the channel occupancy. Operation S602 is executed to perform, by the third UE, a channel access procedure after the remaining duration of the channel occupancy.

In some implementations, operation S602 may include sub-operations of: (1) entering a sleep mode during the remaining duration of the channel occupancy; and (2) performing the channel access procedure after the remaining duration of the channel occupancy. In some implementations, operation S602 may include sub-operations of: (1) determining whether the remaining duration of the channel occupancy is equal to zero; and (2) performing the channel access procedure when the remaining duration of the channel occupancy is determined equal to zero.

It should be noted that, in some embodiments, the mentioned channel occupancy for sidelink transmission may be Channel Occupancy Time (COT) used in unlicensed spectrum.

Figure 7:
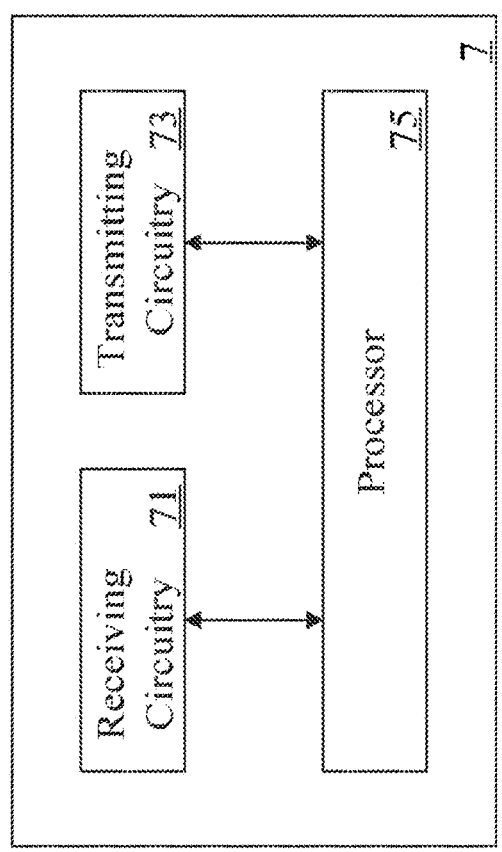
FIG. 7 illustrates a block diagram of an exemplary apparatus in accordance with some embodiments of the present application.

FIG. 7 illustrates an example block diagram of an apparatus 7 according to an embodiment of the present disclosure.

As shown in FIG. 7, the apparatus 7 may include at least one non-transitory computer-readable medium (not illustrated in FIG. 7), a receiving circuitry 71, a transmitting circuitry 73, and a processor 75 coupled to the non-transitory computer-readable medium (not illustrated in FIG. 7), the receiving circuitry 71 and the transmitting circuitry 73. The apparatus 7 may be an UE.

Although in this figure, elements such as processor 75, transmitting circuitry 73, and receiving circuitry 71 are described in the singular, the plural is contemplated unless limitation to the singular is explicitly stated. In some embodiments of the present disclosure, the receiving circuitry 71 and the transmitting circuitry 73 are combined into a single device, such as a transceiver. In certain embodiments of the present disclosure, the apparatus 7 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 7 interacting with receiving circuitry 71 and transmitting circuitry 73, so as to perform the operations with respect to UE depicted in FIGS. 1 to 4.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A first user equipment (UE) for wireless communication, comprising:
   at least one memory; and
   at least one processor coupled with the at least one memory and configured to cause the first UE to:
   perform a channel access procedure for initiating a channel occupancy for sidelink transmission;
   transmit sidelink control information (SCI) to a second UE within the channel occupancy, wherein the SCI includes an indicator indicating a remaining duration of the channel occupancy and using a number of bits in the SCI, the number of bits corresponds to a number of elements in a set of possible values of the remaining duration of the channel occupancy; and
   transmit sidelink data associated with the SCI to the second UE without exceeding the remaining duration of the channel occupancy.

2. The first UE of claim 1, wherein the at least one processor is configured to cause the first UE to update the remaining duration of the channel occupancy from slot to slot within the channel occupancy.

3. The first UE of claim 1, wherein a maximum value of the remaining duration of the channel occupancy is equal to a maximum duration of the channel occupancy minus a duration of one slot, and the maximum duration of the channel occupancy is determined based on a channel access priority class and a subcarrier spacing.

4. The first UE of claim 1, wherein the indicator indicates consistent information of the remaining duration of the channel occupancy, the consistent information of the remaining duration of the channel occupancy is indicated in unit of slots, and the remaining duration of the channel occupancy indicated in a slot n is equal to another remaining duration of the channel occupancy indicated in a slot n+1 plus duration of one slot.

5. The first UE of claim 1, wherein the remaining duration of the channel occupancy is indicated in a unit of millisecond, slot, or symbol.

6. The first UE of claim 1, wherein at least one of:
   the set of possible values of the remaining duration of the channel occupancy is configured by radio resource control (RRC) signalling or predefined in default;
   the set of possible values of the remaining duration of the channel occupancy includes a specific element for indicating that the remaining duration of the channel occupancy is non-available; or
   the number of bits in the SCI is x determined as:

$$x = \lceil \log_2 N \rceil$$

where N is the number of elements in the set of possible values of the remaining duration of the channel occupancy.

7. The first UE of claim 1, wherein the number of bits in the SCI is x and the at least one processor is configured to cause the first UE to determine x as at least one of:

$$x=\lceil\log_2(M-1)\rceil$$

where M is a maximum number of slots of the channel occupancy; or $$x=\lceil\log_2(a\times(M-1))\rceil$$

where a is a number of symbols of one slot and M is the maximum number of slots of the channel occupancy.

8. The first UE of claim 1, wherein the remaining duration of the channel occupancy includes a duration of one or more physical sidelink control channel (PSCCH) transmissions, one or more physical sidelink shared channel (PSSCH) transmissions, one or more physical sidelink feedback channel (PSFCH) transmissions, or a gap between the one or more PSSCH transmissions and the one or more PSFCH transmissions.

9. A first user equipment (UE) for wireless communication, comprising:
at least one memory; and
at least one processor coupled with the at least one memory and configured to cause the first UE to:
receive sidelink control information (SCI) from a second UE within a channel occupancy initiated by the second UE, wherein the SCI includes an indicator indicating a remaining duration of the channel occupancy and using a number of bits in the SCI, the number of bits corresponds to a number of elements in a set of possible values of the remaining duration of the channel occupancy; and
receive sidelink data associated with the SCI from the second UE without exceeding the remaining duration of the channel occupancy.

10. The first UE of claim 9, wherein the at least one processor is configured to cause the first UE to:
perform a channel access procedure; and
transmit sidelink feedback to the second UE in response to the channel access procedure being successful, wherein the channel access procedure is Type-2 channel access procedure in response to the sidelink feedback being transmitted inside of the remaining duration of the channel occupancy or Type-1 channel access procedure in response to the sidelink feedback being transmitted outside of the remaining duration of the channel occupancy.

11. The first UE of claim 9, wherein the at least one processor is configured to cause the first UE to update the remaining duration of the channel occupancy from slot to slot within the channel occupancy.

12. The first UE of claim 9, wherein a maximum value of the remaining duration of the channel occupancy is equal to a maximum duration of the channel occupancy minus a duration of one slot, and the maximum duration of the channel occupancy is determined based on a channel access priority class and a subcarrier spacing.

13. The first UE of claim 9, wherein the indicator indicates consistent information of the remaining duration of the channel occupancy, the consistent information of the remaining duration of the channel occupancy is indicated in unit of slots, and the remaining duration of the channel occupancy indicated in a slot n is equal to another remaining duration of the channel occupancy indicated in a slot n+1 plus duration of one slot.

14. The first UE of claim 9, wherein the remaining duration of the channel occupancy is indicated in millisecond, slot, or symbol.

15. The first UE of claim 9, wherein:
the set of possible values of the remaining duration of the channel occupancy is configured by radio resource control (RRC) signalling or predefined in default;
the set of possible values of the remaining duration of the channel occupancy includes a specific element for indicating that the remaining duration of the channel occupancy is non-available; and
wherein the number of bits in the SCI is x determined as:

$$x=\lceil\log_2 N\rceil$$

where N is the number of elements in the set of possible values of the remaining duration of the channel occupancy.

16. The first UE of claim 9, wherein the number of bits in the SCI is x and the at least one processor is configured to cause the first UE to determine x as at least one of:

$$x=\lceil\log_2(M-1)\rceil$$

where M is a maximum number of slots of the channel occupancy; or $$x=\lceil\log_2(a\times(M-1))\rceil$$

where a is a number of symbols of one slot and M is the maximum number of slots of the channel occupancy.

17. The first UE of claim 9, wherein the remaining duration of the channel occupancy includes a duration of one or more physical sidelink control channel (PSCCH) transmissions, one or more physical sidelink shared channel (PSSCH) transmissions, one or more physical sidelink feedback channel (PSFCH) transmissions, or a gap between the one or more PSSCH transmissions and the one or more PSFCH transmissions.

18. A first user equipment (UE) for wireless communication, comprising:
at least one memory; and
at least one processor coupled with the at least one memory and configured to cause the first UE to:
detect sidelink control information (SCI) transmitted from a second UE within a channel occupancy initiated by the first UE, wherein the SCI includes an indicator indicating a remaining duration of the channel occupancy and using a number of bits in the SCI, the number of bits corresponds to a number of elements in a set of possible values of the remaining duration of the channel occupancy; and
perform a channel access procedure after the remaining duration of the channel occupancy, wherein the indicator indicates consistent information on the remaining duration of the channel occupancy, and the consistent information on the remaining duration of the channel occupancy is indicated in unit of slots.

19. The first UE of claim 18, wherein to perform the channel access procedure after the remaining duration of the channel occupancy, the at least one processor is configured to cause the first UE to:
enter a sleep mode during the remaining duration of the channel occupancy; and
perform the channel access procedure after the remaining duration of the channel occupancy.

20. The first UE of claim 18, wherein to perform the channel access procedure after the remaining duration of the channel occupancy, the at least one processor is configured to cause the first UE to:
- determine whether the remaining duration of the channel occupancy is equal to zero; and
- perform the channel access procedure when the remaining duration of the channel occupancy is determined equal to zero.

\* \* \* \* \*